US007037048B2

(12) United States Patent
Markowski et al.

(10) Patent No.: US 7,037,048 B2
(45) Date of Patent: May 2, 2006

(54) VIBRATORY SPIRAL CONVEYOR

(75) Inventors: Robert Markowski, McHenry, IL (US); Kurt Christopherson, South Elgin, IL (US); Richard B. Kraus, Barrington, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 0 days.

(21) Appl. No.: 10/745,228

(22) Filed: Dec. 23, 2003

(65) Prior Publication Data

US 2004/0168889 A1 Sep. 2, 2004

Related U.S. Application Data

(60) Provisional application No. 60/436,352, filed on Dec. 23, 2002.

(51) Int. Cl.
*B65G 53/40* (2006.01)

(52) U.S. Cl. .......................... 406/73; 406/75; 198/778

(58) Field of Classification Search .................. 406/52, 406/66, 73, 74, 75, 93; 198/778
See application file for complete search history.

(56) References Cited

U.S. PATENT DOCUMENTS

| | | | |
|---|---|---|---|
| 2,927,683 | A | 3/1960 | Carrier, Jr. |
| 3,789,977 | A | 2/1974 | Musschoot |
| 3,848,343 | A | 11/1974 | Musschoot |
| 3,850,288 | A | 11/1974 | Musschoot |
| 4,140,215 | A | 2/1979 | Musschoot |
| 4,775,284 | A | 10/1988 | Musschoot |
| 5,024,320 | A | 6/1991 | Musschoot |

FOREIGN PATENT DOCUMENTS

| | | |
|---|---|---|
| DE | 4106712 | 6/1992 |
| DE | 4228543 | 11/1993 |
| GB | 2235756 | 3/1991 |

OTHER PUBLICATIONS

Copy of International Search Report for International Patent Application No. PCT/US03/41235, dated Jun. 23, 2004, 7 pages.

*Primary Examiner*—James R. Bidwell
(74) *Attorney, Agent, or Firm*—Marshall, Gerstein & Borun LLP

(57) ABSTRACT

A vibratory conveyor for transporting an object includes a deck defining a conveying surface for supporting the object, the deck having an inner edge and an outer edge. A housing has an inner wall coupled to the inner edge of the deck and an outer wall coupled to the outer edge of the deck, wherein an interior of the housing defines a conveyor chamber. An inlet air plenum is provided in fluid communication with a plurality of air distribution chambers positioned inside the conveyor chamber. A plurality of apertures is formed in the plurality of air distribution chambers, wherein the apertures are arranged in an air distribution pattern. An exhaust outlet fluidly communicates between the conveyor chamber and an air vacuum source. The conveyor may a catch floor disposed in a central chamber for receiving debris from an air stream. The vibratory force advances the debris to a discharge opening formed in the catch floor.

13 Claims, 3 Drawing Sheets

VIBRATORY SPIRAL CONVEYOR

CROSS-REFERENCE TO RELATED APPLICATION

This application claims the benefit under 35 U.S.C. § 119(e) of U.S. provisional patent application Ser. No. 60/436,352 filed Dec. 23, 2002, the disclosure of which is incorporated herein by reference.

FIELD OF THE DISCLOSURE

The present disclosure generally relates to vibratory process equipment and, more particularly, to vibratory spiral conveyors for transporting work pieces in a helical path.

BACKGROUND OF THE DISCLOSURE

Vibratory spiral conveyors are generally known in the art. Such apparatus typically includes a spiral deck, formed in the shape of a helix, and a source of vibration operatively coupled to the deck. The spiral conveyor may be a brute force system, such as that disclosed in U.S. Pat. No. 2,927, 683 to Carrier, or a two-mass system, as disclosed in U.S. Pat. No. 5,024,320 to Musschoot.

Spiral conveyors are often used to heat or cool work pieces or granular material. With foundry castings, for example, red hot castings (which may have a temperature of approximately 1000 degrees F. or more) are fed into the spiral conveyor. Cool air is directed over the castings as the castings travel up the spiral, thereby to reduce the temperature of the castings. Conventional spiral conveyors direct air from a center axis of the conveyor outwardly, with or without nozzles for directing the air toward the castings. The air is exhausted out an exterior of the spiral conveyor.

In one conventional design, air is generally directed radially across the spiral conveyor from the center core inlets to the outer periphery outlets. As a result, the inner facing side of the castings (or the inner row, should more than one row of castings be fed into the conveyor) will receive a lower temperature air than the outer facing side (or outer row).

In another conventional design, both the air inlet and air outlet are positioned at the outer periphery of the spiral conveyor. As the air enters the spiral conveyor area, it passes about the center core in at least two separate sub-streams. The air then exhausts from the spiral conveyor through a common outlet.

The castings can include foundry sand that may become entrained in the cooling air stream. Typically very light particles, such as small grains of sand or sprue, are picked up by the air stream. Consequently, a filter house is typically connected to the outlet air stream to collect the particles before the air is exhausted to atmosphere. The filter house is typically provided as a separate unit, and is located outside of the spiral conveyor, thereby requiring additional space for the conveying equipment.

DETAILED DESCRIPTION

Figure 1:
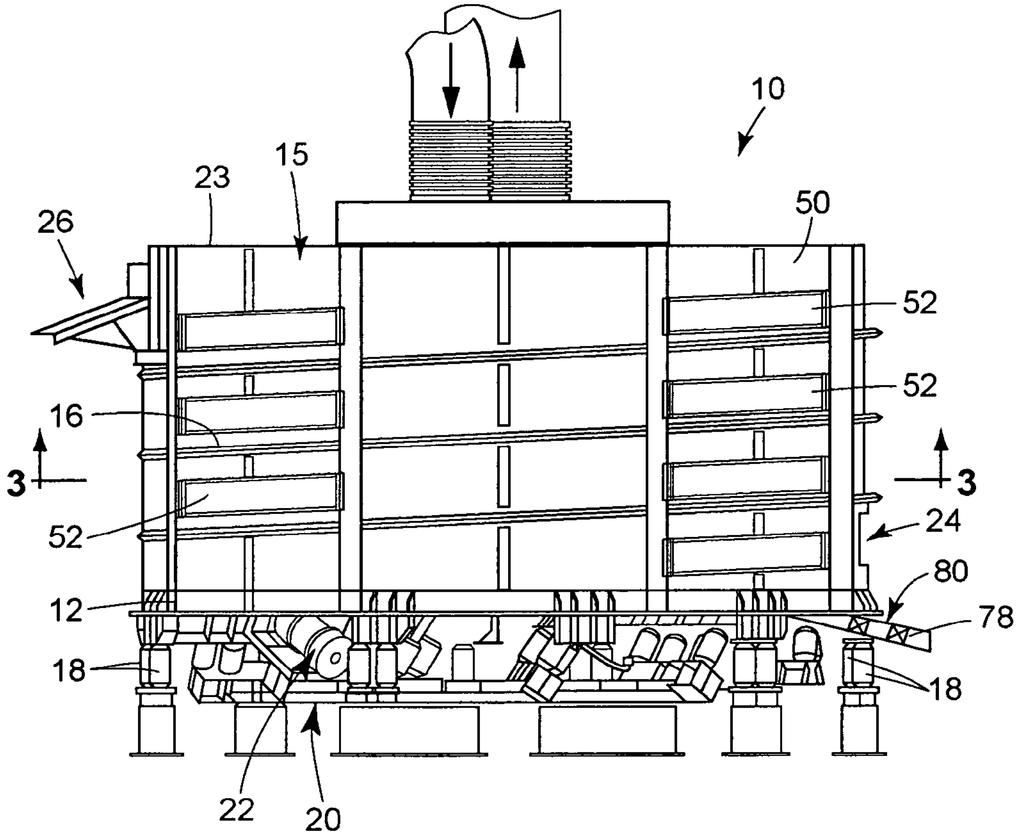
FIG. 1 is a side elevation view of a vibratory spiral conveyor constructed in accordance with the teachings of the present disclosure.
Figure 2:
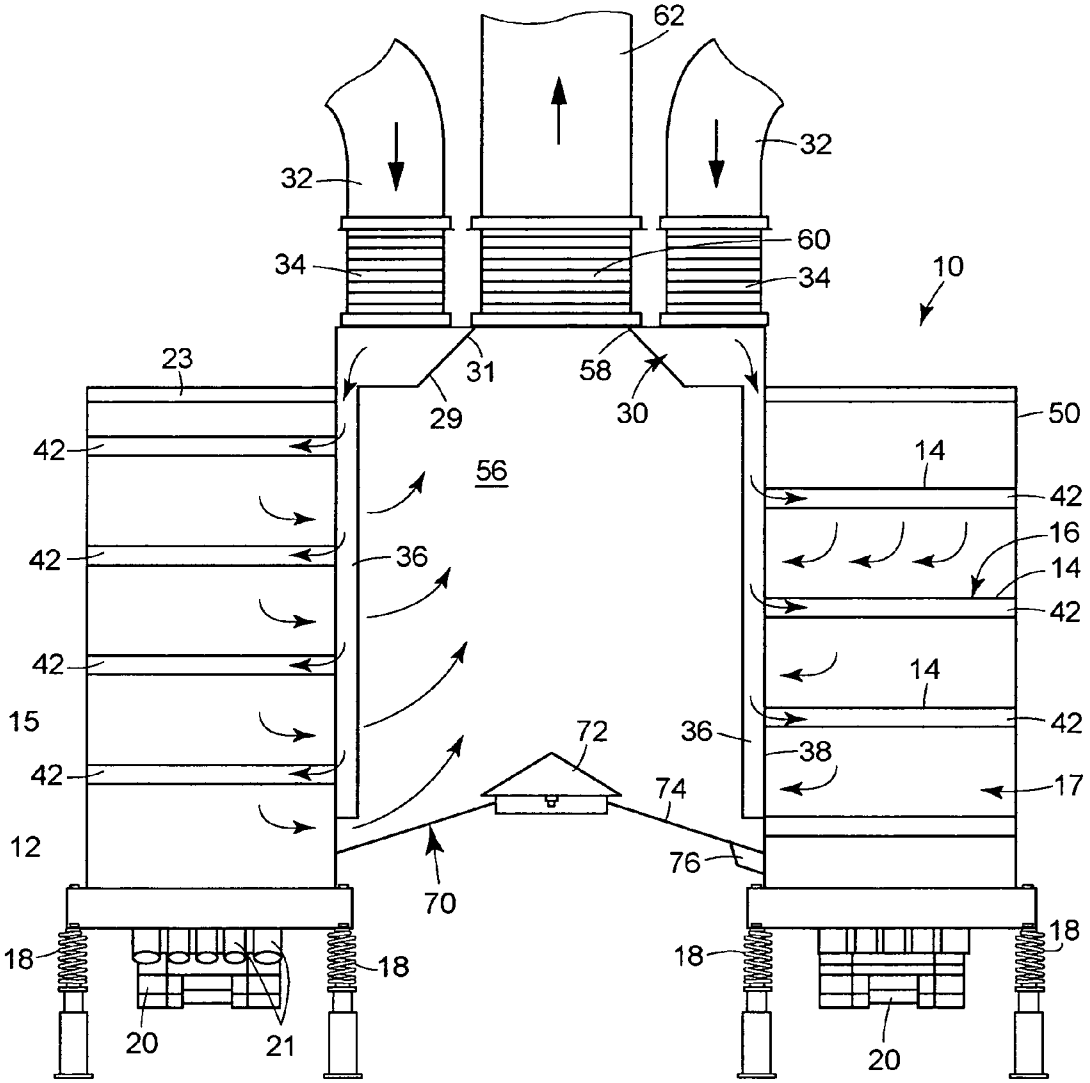
FIG. 2 is an enlarged sectional side view of the conveyor of FIG. 1.

Referring to FIGS. 1 and 2, a spiral conveyor 10 is shown having a frame 12 supporting a spiral deck 16. As used herein, the word spiral includes helix and helicoid shapes. The frame 12 is resiliently supported above the ground or mounting surface by isolation means, such as springs 18. An exciter mass 20 and vibration generators 22 are resiliently coupled to the trough frame 12, such as by springs 21 (FIG. 2). Any generally known vibration generators may be used, such as motors having rotating shafts carrying eccentric weights.

A housing 15 is provided for enclosing the spiral deck 16 and defining a conveyor chamber 17. As best shown with reference to FIG. 3, the spiral deck includes an inner edge 19 and an outer edge 21. The housing 15 has a cylindrical inner wall 38 coupled to the spiral deck inner edge 19 and a cylindrical outer wall 50 coupled to the spiral deck outer edge 21. The housing 15 may also include a top wall 23 (FIG. 2), so that the housing 15 completely encloses the spiral deck 15 but for a housing inlet 24 and outlet 26. Accordingly, the housing 15 and spiral deck 16 define the conveyor chamber 17, which has a spiral configuration in the illustrated embodiment. A plurality of access doors 52 (FIG. 1) may be formed in the housing outer wall 50 for accessing the conveyor chamber 17 and deck 16.

In the illustrated embodiment, the spiral deck 16 is oriented to vertically elevate work pieces, such as hot castings, from the inlet 24 to the outlet 26. The work pieces may be transferred from an origination point, such as a molding line, to the inlet 24 by any conveying means, such as by a linear vibratory or other type of conveyor (not shown). The spiral deck 16 is formed in a helical pattern so that, as the work pieces move circumferentially around the deck, they are also elevated in the vertical direction. At the outlet 26, the work piece may be deposited onto an outlet transport (not shown), which may also be a conveyor. While the conveyor 10 is described herein as conveying the work pieces vertically upward, the inlet and outlet may be reversed so that the work pieces are conveyed vertically downward along the spiral deck 16.

When viewed in elevational cross-section, as shown in FIG. 2, the spiral deck 16 defines a plurality of stacked tier segments 14. The tier segments 14 are vertically aligned so that adjacent tier segments 14 define upper and lower boundaries of a cross-sectional area of the conveyor chamber 17.

The vibration generators 22 may be controlled in any known fashion to produce the desired vibrational motion of the trough frame 12 and coupled spiral deck 16 to advance the work pieces along the deck 16. For example, the motors may be rotated in opposite directions (i.e., counter-rotated) and controlled to maintain a desired phase angle between the eccentric weights. While the illustrated embodiment is a two mass system, it will be appreciated that the conveyor 10 may be provided as a single mass or brute force system.

Figure 3:
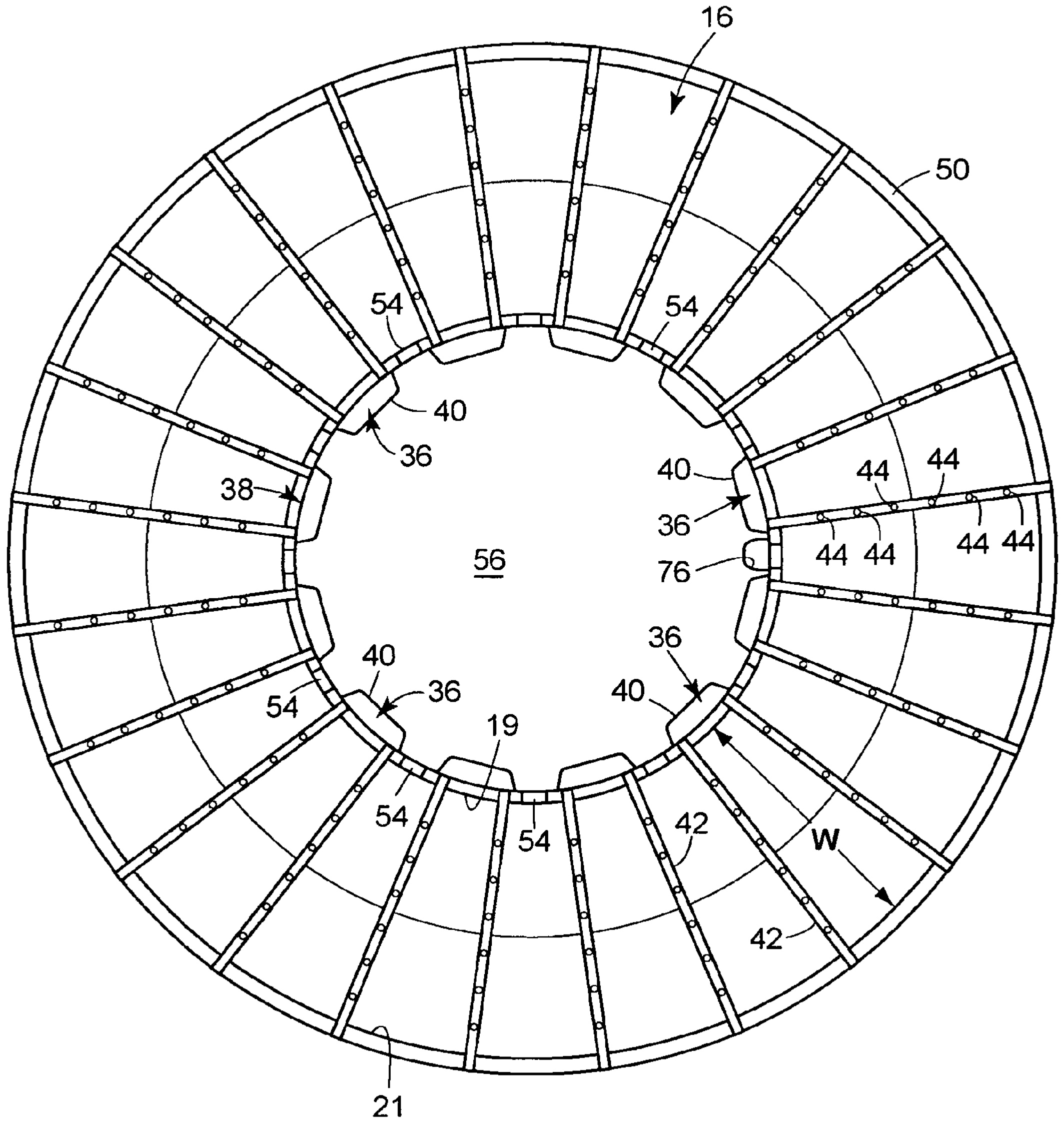
FIG. 3 is an enlarged cross-sectional view taken along line 3—3 of FIG. 1.

An air distribution system is provided for directing air over the work pieces as they travel along the spiral deck 16. As best shown in FIG. 2, a plenum housing 29 defines an inlet air plenum 30 formed near a top of the spiral deck 16 and within a central chamber 56 defined by the housing inner wall 38. As shown in FIG. 3, a pair of air inlet ducts 32 is connected to the plenum housing 29 by flexible joints 34. Alternatively, a single inlet duct 32 or more than two inlet ducts 32 may communicate with the inlet air plenum 30. Extending downwardly from the inlet air plenum 30 is a plurality of vertical air conduits 36. As best shown in FIG.

3, the housing inner wall 38 forms outer portions of each conduit 36, while concave chamber walls 40 form a remainder of each conduit 36.

A plurality of air distribution chambers 42 is attached to a bottom side of the spiral deck 16 and communicates with each vertical air conduit 36. The air distribution chambers may be oriented to extend generally horizontally and, as best shown in FIG. 3, may be aligned generally radially between the housing inner wall 38 and housing outer wall 50. In the illustrated embodiment, a pair of air distribution chambers 42 on each spiral deck tier portion 14 fluidly communicates with a respective vertical air conduit 36. Alternatively, each air conduit 36 may fluidly communicate with a single air distribution chamber 42 or more than two air distribution chambers 42 on each spiral deck tier portion 14. While FIG. 3 illustrates a single tier portion 14 of the spiral deck 16, it will be appreciated that similar sets of air distribution chambers 42 may be constructed on each of the spiral deck tier segments 14, so that each conduit 36 may communicate with multiple vertical levels of air distribution chambers 42.

Each air distribution chamber 42 includes a plurality of spaced nozzles 44 oriented to direct air flow downwardly toward the next lower tier. The nozzles 44 may be apertures formed in a bottom of the air distribution chambers 42. The apertures are arranged across at least a portion of a lateral width "W" of the spiral deck 16 to form an air distribution pattern. In the illustrated embodiment, the apertures are generally equally spaced across the entire lateral width "W" of the spiral deck 16.

The vertical air conduits 36 and horizontal air chambers 42 may be formed of structural steel members, such as channels and angles, to provide structural support to the spiral conveyor 10. In this case, the conduits 36 and chambers 42 provide the dual functions of air distribution and structural support.

The vibratory conveyor 10 further provides for exhaust of air out of the conveyor chamber. As best shown in FIG. 3, a plurality of outlet openings 54 are formed in the housing inner wall 38, each opening 54 being positioned between adjacent vertical air conduits 36. The outlet openings 54 fluidly communicate with the central chamber 56 defined by the housing inner wall. An air exhaust outlet 58 fluidly communicates with the central chamber 56 and is coupled, such as by flexible joint 60, to exhaust duct 62. The exhaust duct 62 may communicate with an air vacuum source 63 (schematically illustrated in FIG. 2), such as an exhaust fan, to create air flow through the air distribution system. In the illustrated embodiment, the plenum housing 29 has a generally annular shape, so that an inner edge 31 of the plenum housing 29 defines the exhaust outlet 58.

In operation, the air vacuum source pulls air through the inlet ducts 32 to the inlet air plenum 30. The air stream flows from the plenum through the air conduits 36 and air distribution chambers 42 for discharge through the nozzles 44, which evenly distribute air across the entire lateral width "W" of the spiral deck 16. The air vacuum source is preferably sized so that the air stream discharged from each nozzle 44 has a velocity sufficiently high to create non-laminar flow around the work pieces. By creating a non-laminar air flow, the heat transfer coefficient for the system is increased, thereby increasing heat transfer, which is beneficial for both heating and cooling applications. The air exits the conveyor chamber 17 through the outlet openings 54 and into the central chamber 56, where it is discharged through the exhaust outlet 58.

The conveyor 10 may include a fines collection system for collecting any fines entrained in the air stream passing through the conveyor chamber 17. The objects or work pieces loaded into the conveyor 10 may include unwanted debris, such as sand, sprue, or other fines material. To remove this debris from the air stream, the fines collection system may include a catch floor 70 extending across a bottom of the central chamber 56 and coupled to the housing 15 below the lowest outlet opening 54. In the illustrated embodiment, the catch floor includes a conical center portion 72 attached to a frusto-conical outer portion 74. A fines discharge opening 76 is formed at an outer periphery of the outer portion 74 and communicates with a fines discharge chute 78 (FIG. 1). The discharge opening communicates with atmosphere via the chute 78, and therefore the negative pressure in the central chamber 56 creates a pressure differential that tends to hold the fines within the chamber 56. As schematically illustrated in FIG. 1, an air lock 80 may be provided in the chute 78 to allow and control discharge of fines through the chute.

In operation, air is discharged from the nozzles 44 at a relatively high velocity, so that fines may become dislodged from the work pieces and entrained in the air stream. The air stream then passes through the outlet openings 54, which causes a pressure drop and associated reduction in velocity of the air stream as it enters the central chamber 56. The reduced velocity causes the fines entrained in the air stream to drop to the catch floor 70. The vibratory motion of the spiral deck 16 and attached catch floor 70 moves the particles toward an outer periphery of the catch floor outer portion 74. The circular component of the vibratory motion conveys the particles circumferentially about the floor periphery until the particles reach the discharge opening 76, at which point they travel down the discharge chute 78 and into the air lock 80. The air lock 80 may be operated to periodically interrupt fluid communication between the chute 78 and the central chamber 56, thereby to allow a batch of fines to be discharged from the chute 78 for collection.

The fines collection system utilizes the existing internal structure of the spiral conveyor to collect and discharge particles entrained in the air stream. As a result, separate filter houses are not required and the space required for spiral conveyor apparatus is reduced.

Although certain apparatus constructed in accordance with the teachings of the disclosure have been described herein, the scope of coverage of this patent is not limited thereto. On the contrary, this patent covers all embodiments of the teachings of the disclosure fairly falling within the scope of the appended claims either literally or under the doctrine of equivalents.

What is claimed is:

1. A vibratory spiral conveyor for transporting an object, the conveyor comprising:

a spiral deck defining a conveying surface for supporting the object, the spiral deck having an inner edge and an outer edge;

a housing having an inner wall coupled to the inner edge of the spiral deck and an outer wall coupled to the outer edge of the spiral deck, wherein an interior of the housing defines a conveyor chamber;

an inlet air plenum;

a plurality of air distribution chambers positioned inside the conveyor chamber and fluidly communicating with the inlet air plenum;

a plurality of apertures formed in the plurality of air distribution chambers, wherein the apertures are arranged in an air distribution pattern;

an exhaust outlet fluidly communicating between the conveyor chamber and atmosphere and adapted for fluid communication with an air vacuum source; and a vibratory generator coupled to the spiral deck for generating a vibratory force, wherein the vibratory force advances the object along the spiral deck.

2. The conveyor of claim 1, in which the plurality of air distribution chambers are oriented to extend substantially horizontally.

3. The conveyor of claim 2, in which the plurality of air distribution chambers extend substantially radially between the housing inner wall and the housing outer wall.

4. The conveyor of claim 1, further comprising a plurality of air inlet conduits extending between the inlet air plenum and the air distribution chambers.

5. The conveyor of claim 4, in which the housing inner wall defines a central chamber in fluid communication with the exhaust outlet.

6. The conveyor of claim 5, in which the inlet air plenum and inlet air conduits are disposed within the central chamber.

7. The conveyor of claim 6, in which a plurality of outlet openings are formed in the inner wall to establish fluid communication between the conveyor chamber and the exhaust outlet via the central chamber.

8. The conveyor of claim 7, in which the inlet air plenum is defined by a generally annular plenum housing, and in which an inner edge of the plenum housing defines the exhaust outlet.

9. The conveyor of claim 1, in which the spiral deck defines a plurality of vertically stacked tier segments.

10. The conveyor of claim 9, in which the air distribution chambers are attached to a bottom surface of the spiral deck.

11. The conveyor of claim 10, in which each aperture is directed generally downward toward the conveying surface of the spiral deck at an adjacent lower tier portion.

12. The conveyor of claim 1, in which the apertures are arranged in an air distribution pattern extending at least partially across a lateral width of the spiral deck.

13. The conveyor of claim 1, in which the air vacuum source is sized to generate an air stream through each aperture having a velocity sufficiently high to create non-laminar air flow around the object.

* * * * *

US007037048C1

(12) INTER PARTES REEXAMINATION CERTIFICATE (724th)

United States Patent

Markowski et al.

(10) Number: US 7,037,048 C1

(45) Certificate Issued: Oct. 31, 2013

(54) VIBRATORY SPIRAL CONVEYOR

(75) Inventors: Robert Markowski, McHenry, IL (US); Kurt Christopherson, South Elgin, IL (US); Richard B. Kraus, Barrington, IL (US)

(73) Assignee: General Kinematics Corporation, Crystal Lake, IL (US)

Reexamination Request:
No. 95/002,186, Sep. 12, 2012

Reexamination Certificate for:

| | |
|---|---|
| Patent No.: | **7,037,048** |
| Issued: | **May 2, 2006** |
| Appl. No.: | **10/745,228** |
| Filed: | **Dec. 23, 2003** |

Related U.S. Application Data

(60) Provisional application No. 60/436,352, filed on Dec. 23, 2002.

(51) Int. Cl.
*B65G 53/40* (2006.01)

(52) U.S. Cl.
USPC ................................ 406/73; 406/75; 198/778

(58) Field of Classification Search
USPC ...................................... 406/73, 75; 198/778
See application file for complete search history.

(56) References Cited

To view the complete listing of prior art documents cited during the proceeding for Reexamination Control Number 95/002,186, please refer to the USPTO's public Patent Application Information Retrieval (PAIR) system under the Display References tab.

*Primary Examiner* — Matthew C. Graham

(57) ABSTRACT

A vibratory conveyor for transporting an object includes a deck defining a conveying surface for supporting the object, the deck having an inner edge and an outer edge. A housing has an inner wall coupled to the inner edge of the deck and an outer wall coupled to the outer edge of the deck, wherein an interior of the housing defines a conveyor chamber. An inlet air plenum is provided in fluid communication with a plurality of air distribution chambers positioned inside the conveyor chamber. A plurality of apertures is formed in the plurality of air distribution chambers, wherein the apertures are arranged in an air distribution pattern. An exhaust outlet fluidly communicates between the conveyor chamber and an air vacuum source. The conveyor may a catch floor disposed in a central chamber for receiving debris from an air stream. The vibratory force advances the debris to a discharge opening formed in the catch floor.

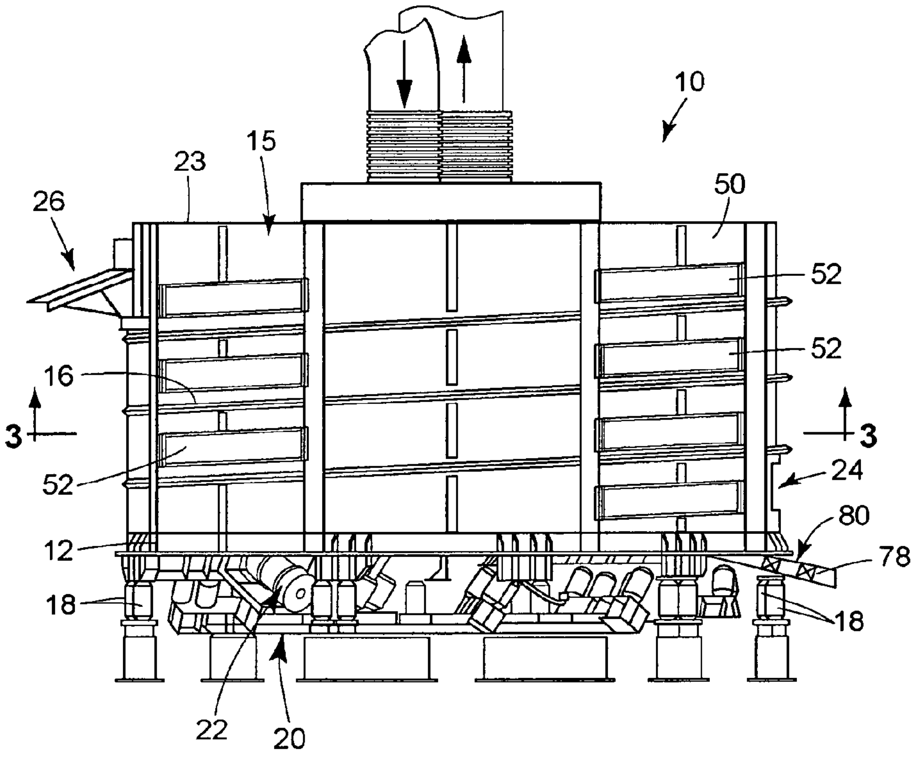

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5 and 9-12 are cancelled.

Claim 13 is determined to be patentable as amended.

Claims 6-8 were not reexamined.

13. [The conveyor of claim 1] *A vibratory spiral conveyor for transporting an object, the conveyor comprising:*

*a spiral deck defining a conveying surface for supporting the object, the spiral deck having an inner edge and an outer edge;*

*a housing having an inner wall coupled to the inner edge of the spiral deck and an outer wall coupled to the outer edge of the spiral deck, wherein an interior of the housing defines a conveyor chamber;*

*an inlet air plenum;*

*a plurality of air distribution chambers positioned inside the conveyor chamber and fluidly communicating with the inlet air plenum;*

*a plurality of apertures formed in the plurality of air distribution chambers, wherein the apertures are arranged in an air distribution pattern;*

*an exhaust outlet fluidly communicating between the conveyor chamber and atmosphere and adapted for fluid communication with an air vacuum source; and*

*a vibratory generator coupled to the spiral deck for generating a vibratory force, wherein the vibratory force advances the object along the spiral deck,* in which the air vacuum source is sized to generate an air stream through each aperture having a velocity sufficiently high to create non-laminar air flow around the object.

* * * * *